United States Patent [19]

Rikimaru et al.

[11] Patent Number: 4,977,127
[45] Date of Patent: Dec. 11, 1990

[54] CATALYST FOR DENITRIZING NITROGEN OXIDES CONTAINED IN WASTE GASES

[75] Inventors: Hiroaki Rikimaru; Tadao Nakatsuji; Toshikatsu Umaba; Kazuhiko Nagano; Kazuya Mishina; Hiromitsu Shimizu, all of Sakai, Japan

[73] Assignees: Sakai Chemical Industry Co., Ltd., Osaka; Mitsubishi Jukogyo Kabushiki Kaisha, Tokyo, both of Japan

[21] Appl. No.: 393,071

[22] Filed: Aug. 7, 1989

Related U.S. Application Data

[63] Continuation of Ser. No. 95,823, Sep. 14, 1987, abandoned.

[30] Foreign Application Priority Data

Sep. 13, 1986 [JP]  Japan ............................ 61-216355
Sep. 30, 1986 [JP]  Japan ............................ 61-234031

[51] Int. Cl.$^5$ .................. B01J 21/06; B01J 23/22; B01J 23/30
[52] U.S. Cl. ............................ 502/309; 502/350; 423/239
[58] Field of Search ................ 502/309, 350, 353; 423/239 A

[56] References Cited

U.S. PATENT DOCUMENTS 4,048,112  9/1977  Matsushita et al. ............ 423/239 A
4,085,193  4/1978  Nakajima et al. .............. 502/309 X
4,466,947  8/1984  Imanari et al. ................. 502/309 X
4,518,710  5/1985  Brennan ......................... 502/309

Primary Examiner—W. J. Shine
Attorney, Agent, or Firm—Wenderoth, Lind & Ponack

[57] ABSTRACT

A catalyst for denitrizing nitrogen oxides contained in waste gases in the presence of arsenic compounds, which comprises: titanium and vanadium therein in weight ratios of oxides of titanium to oxides of vanadium ranging from 99.9:0.1 to 92.0:8.0, the vanadium being concentratedly contained in the surface layer of the catalyst up to 200 μm in depth from the surface of the catalyst in concentrations of at least about 1.5 times as much as the concentrations of vanadium throughout the catalyst.

The catalyst may further contain therein at least one of tungsten and zirconium.

The catalyst preferably has micropores of about not less than about 50 Å in amounts of 0.25-0.40 ml/g, and micropores of about 50-100 Å in radius in amounts of about 10-40% by volume and micropores of about 1000-60000 Å in radius in amounts of not less than about 10% by volume, respectively, based on the total volume of the micropores of not less than about 50Å in radius.

The catalyst retains a higher denitrizing activity over a long period of denitrizing operations in the presence of arsenic compounds contained waste gases than the conventional catalysts.

5 Claims, 2 Drawing Sheets

CATALYST FOR DENITRIZING NITROGEN OXIDES CONTAINED IN WASTE GASES

This application is a continuation of now abandoned application, Ser. No. 07/095,823 filed on Sept. 14, 1987.

This invention relates to a catalyst and a method for denitrizing nitrogen oxides contained in waste gases. More particularly, the invention relates to a catalyst for denitrizing nitrogen oxides which retains a high catalytic activity over a long period of operations, and especially to a catalyst which is resistant to deactivation or poisoning by arsenic compounds such as diarsenic trioxide contained in waste gases together with nitrogen oxides. The invention further relates to a method of denitrizing such waste gases by use of such catalysts.

Denitrizing processes have been recently developed and the processes are industrially carried out in many plants today, to convert noxious nitrogen oxides into innoxious compounds or to remove them from waste gases. In an exemplary denitrizing process, combustion waste gases from coalfired boilers which contains nitrogen oxides therein is mixed with a reducing gas, and the resultant gas mixture are put into contact with a denitrizing catalyst, thereby to reduce the nitrogen oxides into innoxious compounds. A variety of processes are already known, but a selective catalytic reduction process in which ammonia is used as a reducing gas is said most advantageous from the standpoint of controllability of catalytic reduction reactions of nitrogen oxides and process economy.

Heretofore, the process has been applied only to waste gases which contain no arsenic compounds therein or contain arsenic compounds in such trace amounts as give substantially no influence upon the catalytic activity of denitrizing catalysts. However, a substantial amount of arsenic compounds is occasionally contained in combustion waste gases from coalfired boilers depending upon the coal used as a fuel, and it has been noted very recently that denitrizing catalysts are deactivated or poisoned within a short period of time by arsenic compounds when the catalysts are put into contact with such arsenic compounds.

It is, therefore, an object of the invention to provide an economical denitrizing catalyst which retains a high catalytic activity of denitrization over a long period of time.

It is a further object of the invention to provide a denitrizing catalyst which is especially useful for denitrizing waste gases containing a substantial amount of arsenic compounds therein.

It is also an object of the invention to provide a method of catalytic denitrization of waste gases which contain a substantial amount of arsenic compounds therein with effectively suppressing the decrease in denitrizing activity of catalysts.

According to the invention, there is provided a catalyst for denitrizing nitrogen oxides contained in waste gases, which comprises titanium and vanadium therein in weight ratios of oxides of titanium to oxides of vanadium ranging from 99.9:0.1 to 92.0:8.0, the vanadium being concentratedly contained in the surface layer of the catalyst up to 200 $\mu$m, preferably up to 100 $\mu$m, in depth from the surface of the catalyst in concentrations of at least about 1.5 times as much as the concentrations of vanadium throughout the catalyst.

The catalyst of the invention contains titanium and vanadium therein as essential components in weight ratios of oxides of titanium to oxides of vanadium ranging from 99.9:0.1 to 92.0:8.0. When the weight ratio is more than 99.9:0.1, i.e., when the content of vanadium is relatively too small, the resultant catalysts have insufficient denitrizing activity. On the other hand, when the weight ratio is less than 92.0:8.0, there is obtained no additional increase in denitrizing activity of the catalyst.

It is further essential that the catalyst of the invention contains vanadium concentratedly in the surface layer of the catalyst. The surface layer of the catalyst herein the invention means a layer up to about 200 $\mu$m, preferably up to 100 $\mu$m, in depth from the surface of the catalyst, inclusive of the surface, and vanadium is contained in the surface layer in concentrations of at least about 1.5 times as much as the concentrations of vanadium throughout the catalyst. It is likely that under the denitrizing conditions vanadium react with arsenic compounds to form volatile compounds, and is freed from the catalyst. This is one reason why vanadium is concentratedly carried on the surface layer of the catalyst in the invention.

Titanium and vanadium are contained in the catalyst in the form preferably of oxides such as titanium dioxide and vanadium pentoxide, respectively. However, titanium and vanadium may be contained otherwise, for example, in the form of sulfate or nitrate.

Titanium dioxide has a strong affinity for and readily adsorbs thereon arsenic compounds contained in waste gases, and as the results titanium dioxide based denitrizing catalysts are deactivated or poisoned with arsenic compounds within a short period of denitrizing operations. The adsorption of arsenic compounds on titanium dioxide based catalysts is proportional to specific surface area of the titanium dioxide. Therefore, it is desired that the specific surface area of the titanium dioxide in the catalysts is small while not significantly adversely affecting the denitrizing activity of catalysts. From this standpoint, it is preferred that the titanium dioxide contained in the catalyst has large crystallites preferably of 100–250 Å, however, a slight decrease in denitrizing activity is unavoidably attended by the enlargement of the specific surface area of titanium dioxide. Vanadium incorporated concentratedly in the surface layer of the catalyst makes it possible to very efficiently compensate the decrease of the catalytic activity, so that the catalyst of the invention has a high denitrizing activity.

The catalyst of the invention may further contain tungsten or zirconium, or both of tungsten and zirconium. The denitrizing processes by use of catalysts that contain vanadium are more or less accompanied by the oxidation of sulfur dioxide to sulfur trioxide on account of the catalysis of vanadium in favor of the oxidation. It is generally accepted that the oxidation of sulfur dioxide to sulfur trioxide or conversion rates of sulfur dioxide to sulfur trioxide becomes larger as the content of vanadium in the catalysts becomes larger.

Therefore, tungsten is preferably contained in the catalyst since tungsten has a high denitrizing catalysis, but is inactive to sulfur dioxide. Tungsten may be contained in the catalyst in weight ratios of oxides of titanium to oxides of tungsten ranging from 98.0:2.0 to 70.0:30.0. When the weight ratio is more than 98.0:2.0, the relative amount of tungsten in the catalyst is too small, so that the tungsten fails to provide a sufficient denitrizing activity with catalysts, whereas when the weight ratio is less than 70.0:30.0, i.e., when the relative amount of tungsten is too large, no additional increase of denitrizing activity is expected, but also the production costs are too expensive. It is preferred that tungsten is incorporated in catalysts in such manners that a part of vanadium is displaced by tungsten especially when the suppression of the oxidation of sulfur dioxide is desired, while a high denitrizing acitivity is retained.

Zirconium in turn is less adsorptive of arsenic compounds than titanium dioxide, and may be contained in the catalysts in weight ratios of oxides of titanium to oxides of zirconium ranging from 99.5:0.5 to 90.0:10.0. When the ratio is more than 99.5:0.5, the relative amount of zirconium is too small, resulting in no increase in resistance to arsenic compounds. However, the incorporation of zirconium in weight ratios less than 90.0:10.0, zirconium adversely affects the catalysts, for instance, the micropores of the catalysts are clogged, and moreover, the production costs unnecessarily increase.

Tungsten and zirconium may be either concentratedly contained in the surface layer of the catalyst in concentrations of at least about 1.5 times as much as the concentrations of tungsten and zirconium throughout the catalyst, respectively, preferably in the form of oxides, such as tungsten trioxide and zirconium dioxide, respectively, or uniformly distributed throughout the catalyst.

The catalyst of the invention may be produced in any conventional manner known in the art, however, a method is preferred, for example, in which titanium dioxide is first molded into a desired shape, the mold is immersed in or impregnated with aqueous solutions or dispersions of compounds of vanadium, and if desired of tungsten or zirconium, or both, at the same time or by turns, the mold is taken out of the solutions or dispersions, and then immediately dried in a short time, followed by calcining. Tungsten and zirconium may be carried on the mold and the mold may be dried and calcined stepwise or by turns. In place of the impregnation or immersion method as above, the solutions or dispersions of compounds of vanadium, and if desired of tungsten or zirconium, may be coated or sprayed on the titanium dioxide molds. Further, tungsten and zirconium components may be kneaded together with titanium dioxide, if necessary, and formed into a mold.

The catalyst of the invention may contain clay substances such as montmorillonite, terra abla, bentonite, kaolin, halloysite or sericite; inorganic oxides such as porous silica, alumina, silica, magnesia or zirconia; and heat-resistant inorganic fibers such as glass wool, glass fibers, rock wool or other ceramic fibers, to improve moldability of mixtures of the components in the production of the catalysts, or to provide a high mechanical strength with the catalysts obtained. These additives may be contained in the catalyst in amounts of not more than about 50% by weight based on the weight of the catalyst. Other molding auxiliaries such as binders may be used when molds are formed, when necessary.

The catalyst of the invention may have dual micropore structures to have a higher resistance to deactivation or poisoning with arsenic compounds contained in waste gases. It is preferred that the catalyst has micropores of about not less than about 50 Å in amounts of 0.25–0.40 ml/g, and micropores of about 50–100 Å in radius in amounts of about 10–40% by volume and micropores of about 1000–60,000 Å in radius in amounts of not less than about 10% by volume, respectively, based on the total volume of the micropores of not less than about 50 Å in radius.

It has now been found out that the above-mentioned dual micropore structures per se unexpectedly permits the catalyst to retain a high denitrizing activity over a long period of denitrizing operations in the presence of arsenic compounds. Therefore, the catalyst that has not only the dual micropore structures but also vanadium (and if desired together with tungsten and/or zirconium) concentratedly carried in the surface layer is further improved in resistance to deactivation with arsenic compounds contained in waste gases. The catalyst retains an initial high denitrizing activity over a long period of operations in the presence of arsenic compounds.

The dual micropore structures are formed by calcining molds which contain therein organic materials which burn out when the molds are calcined. As such organic materials, thermoplastic resins such as polyethylene, polypropylene, polyvinyl alcohol, polyethylene oxide, polyacrylamide or polystyrene, cellulosic materials such as crystalline cellulose or methyl cellulose, urea, ammonium stearate, waxes, organic fibers such as acrylic fibers or silk fibers, lactose, corn starch, wheat flour and the like are usable. Inorganic materials such as ammonium carbonate are also usable.

The catalyst of the invention is not specifically limited in shapes and dimensions, but may be in any shape of any dimensions, and therefore, it may be in the form of pellets, spheres, plates, tubes or honeycombs, for example. Any molding method is adoptable in the production of the catalyst. By way of example, extrusion, tableting or tumbling granulation may be employed depending upon the required properties.

The catalyst of the invention in the form of honeycombs is especially useful for use in denitrizing a large quantity of waste gases that contain a substantial amount of arsenic compounds and sulfur dioxide together with dusts therein. The catalyst in the form of honeycombs has walls of about 0.6–1.8 mm, preferably of 1.0–1.4 mm in thickness, and contains titanium, tungsten and vanadium therein in weight ratios of oxides of titanium to oxides of tungsten and oxides of vanadium ranging from 92.5:6.9:0.6 to 82.4:16.5:1.1. In the catalyst titanium is contained in amounts of abouit 70–90% by weight in terms of titanium dioxide, and the vanadium is concentratedly contained in the surface layer of the catalyst up to 200 μm, preferably up to 100 μm, in depth from the surface of the catalyst in concentrations of at least about 1.5 times as much as the concentrations of vanadium throughout the catalyst. The tungsten may be in part or entirely displaced by molybdenum. The catalyst may further contain zirconium, preferably in the form of zirconium dioxide, therein. The catalyst also preferably has the dual micropore structure as beforementioned.

According to the invention, there is provided a method for denitrizing nitrogen oxides contained in waste gases which contains a substantial amount of arsenic compounds as well therein, which comprises putting the waste gas into contact with the catalyst as described hereinbefore in the presence of a reducing gas, at elevated temperatures, thereby to convert the nitrogen oxides, which include nitrogen monoxide, dinitrogen trioxide, nitrogen dioxide and nitrogen hexaoxide, into innoxious compounds.

The use of the catalyst of the invention for denitrizing nitrogen oxides in waste gases permits the retention of a high initial denitrizing activity of the catalyst even when the waste gases contain a substantial amount of arsenic compounds therein.

In the method of the invention, the reducing gas may be either hydrogen, hydrocarbons, carbon monoxide or ammonia, however, ammonia is most preferred as described hereinbefore. The amount of the reducing gases used is usually not more than about 10 times, and is preferably in the range of about 0.2-2 times, as much as the stoichiometric amount needed to reduce the nitrogen oxides contained in waste gases. When ammonia gas is used, it is preferred that the amount is not more than the stoichiometric amount needed to reduce the nitrogen oxides contained in waste gases to prevent secondary pollution due to unreacted ammonia. The most advantageous amount of ammonia is in the range of 0.2-1.0 times as much as the stoichiometric amount needed to reduce the nitrogen oxides in waste gases.

In the method of the invention, the waste gases are put into contact with the catalyst preferably at temperatures of about 100°-550° C., more preferably of about 200°-500° C., most preferably of about 250°-400° C., in the presence of a reducing gas. Usually the waste gas is passed through as a mixture with a reducing gas a reactor having the catalysts fitted therein. The space velocity of the gas mixture is preferably in the range of 1000–100,000 $hr^{-1}$, more preferably 2000-50000 $hr^{-1}$, most preferably 3000-30,000 $hr^{-1}$ at pressures of about 1-10 $kg/cm^2$.

The catalyst and method of the invention are suitably applicable to denitrizing of waste gas which contains nitrogen oxides and arsenic compounds, and they are especially useful when used for denitrization of combustion waste gases which contain about 100-1000 ppm of nitrogen oxides, mainly nitrogen monoxide, about 200-2000 ppm of sulfur oxides, mainly sulfur dioxide, about 1-10% by volume of oxygen, about 5-20% by volume of carbon dioxide, about 5-20% by volume of water vapor, and a substantial amount of arsenic compounds, i.e. not less than about 0.001 ppm. The catalyst and method of the invention are most useful when they are used for denitrization of combustion waste gases from coal-fired boilers which contain arsenic oxides, mainly diarsenic trioxide, in amounts of about 0.01-1.0 ppm since when the conventional catalysts are used to denitrize such waste gases, they are deactivated within a very short time of period. However, the method of the invention is not specifically limited in the concentration of arsenic oxides in waste gases.

Figure 1:
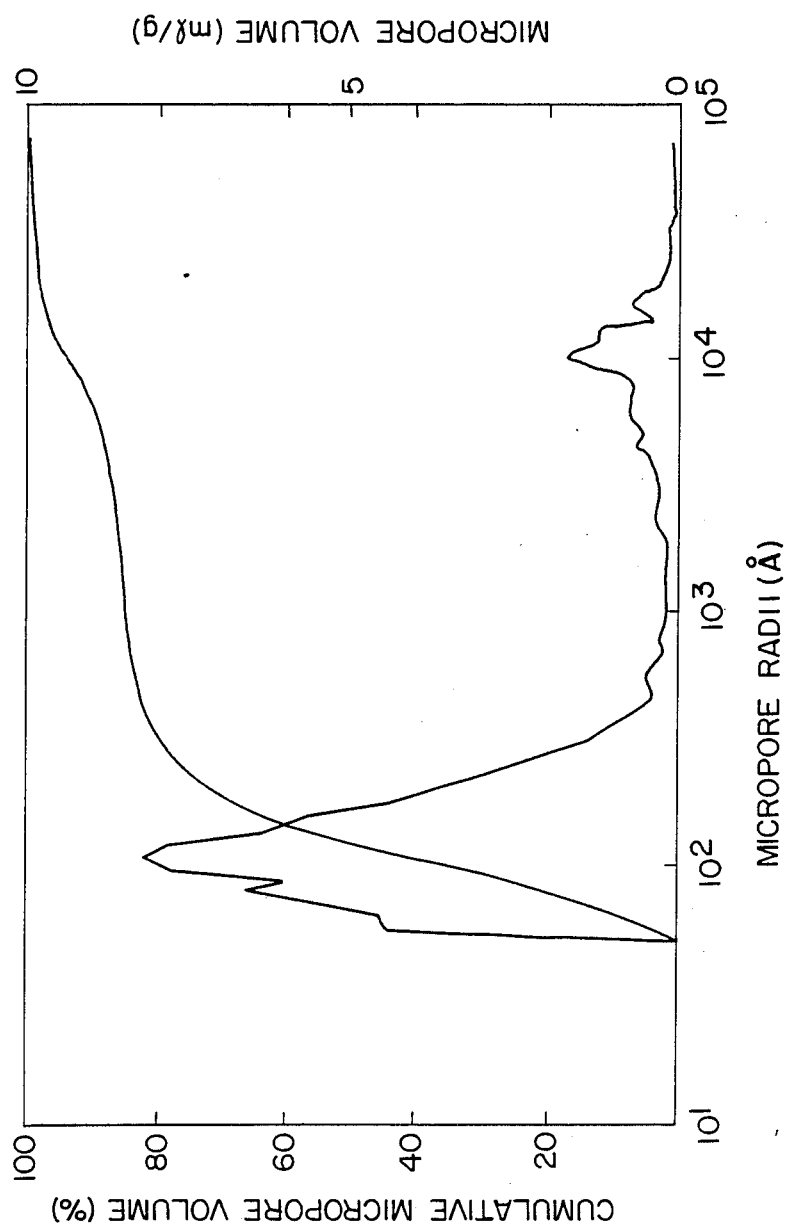
FIG. 1 is a graph showing the relationship between micropore distribution and cumulative micropore volume of the catalyst.

The invention will be more easily understood with reference to the following examples, which however are intended to illustrate the invention only and are not to be construed as limiting the scope of the invention.

EXAMPLE 1

Metatitanic acid which was obtained as an intermediate in the production of titanium dioxide by a sulfuric acid process was neutralized, filtered and washed, to provide metatitanic acid cake. An amount of 8 kg of 67.5% aqueous nitric acid solution was added to 800 kg (in terms of titanium dioxide) of the metatitanic acid cake to partially peptize the metatitanic acid. The resultant sol solution was spray-dried, and then the resultant particles were calcined at temperatures of 450° C. for 3 hours. After cooling, the particles were pulverized to fine powders of titanium dioxide of 2 $\mu$m in average particle size.

An amount of 300 lit. of an aqueous solution of monoethanol amine containing therein 100 kg of ammonium paratungstate, 50 kg of polyvinyl alcohol and 100 kg of glass chopped strands of 5 mm in fibers length and 9 $\mu$m in diameter (Nitto Boseki K.K., Japan) were added to 800 kg of the titanium dioxide powders together with about 100 lit., and the resultant mixture was kneaded.

The kneaded mixture was then molded into a honeycomb structure by use of a screw extruder provided with a honeycomb forming nozzle. The thus obtained mold was left standing for drying for sufficient period of time, and then air dried at 100° C. for 5 hours. The mold was then cut at both axial ends to a predetermined length, and calcined at 450° C. for 3 hours in an electric oven, to provide a honeycomb mold of 7.4 mm in cell pitch, 1.35 mm in wall thickness, 150 mm×150 mm in outer diameter, 500 mm in axial length and 5.9 mm in equivalent diameter.

An amount of 19.2 kg of oxalic acid and 7.7 kg of ammonium metavanadate were added to water to form an aqueous solution in an amount of 40 lit. or in concentration of 150 g/l of vanadium pentoxide, which was then diluted to a concentration of 17.9 g/l with water.

The honeycomb mold obtained as above was immersed in the above diluted ammonium metavanadate solution at 60° C., and immediately after taking the mold out of the solution, the mold was heated to 100° C. in 1 hour, dried at 100° C. for 5 hours, and calcined at 450° C. for 3 hours, to provide a honeycomb structure catalyst.

The catalyst was found to contain $TiO_2$, $V_2O_5$ and $WO_3$ in amounts of 79.8%, 0.6% and 8.9% by weight based on the catalyst, respectively, with weight ratios $TiO_2/WO_3/V_2O_5$ of 89.4/10.0/0.7.

REFERENCE EXAMPLE 1

The same honeycomb mold as in Example 1 containing therein titanium dioxide and tungsten trioxide was immersed in the same vanadium solution at room temperatures, taken out of the solution, air-dried at room temperatures for 2.5 hours, heated to 100° C. in 5 hours, dried at 100° C. for 5 hours, and was calcined at 450° C. for 3 hours, to provide a honeycomb structure catalyst.

The catalyst was found to contain $TiO_2$, $V_2O_5$ and $WO_3$ in amounts of 79.8%, 0.6% and 8.9% by weight based on the catalyst, respectively, with weight ratios $TiO_2/WO_3/V_2O_5$ of 89.4/10.0/0.7.

EXAMPLE 2

The same honeycomb mold as in Example 1 containing therein titanium dioxide and tungsten trioxide was immersed in a 240.9 g/l aqueous solution of zirconium oxychloride at room temperatures, dried in the same manner as in Example 1, and then calcined at 450° C. for 3 hours.

After cooling, the mold was immersed in a 17.9 g/l aqueous solution of vanadium at 60° C., dried in the same manner as in Example 1, and then calcined at 450° C. for 3 hours.

The catalyst was found to contain $TiO_2$, $V_2O_5$, $WO_3$ and $ZrO_2$ in amounts of 75.8%, 0.6%, 8.4% and 4.5% by weight based on the catalyst, respectively, with weight ratios $TiO_2/WO_3/ZrO_2/V_2O_5$ of 84.9/9.4/5.0/0.7.

EXAMPLE 3

An amount of 300 lit. of an aqueous solution of monoethanol amine containing therein 100 kg of ammonium paratungstate, 50 kg of polyvinyl alcohol, 50 g of a thermoplastic resin and 100 kg of glass chopped strands of 5 mm in fibers length and 9 μm in diameter (Nitto Boseki K. K., Japan) were added to 800 kg of the same fine powders of titanium dioxide of 2 μm in average particle size together with about 100 lit. of water, and the resultant mixture was kneaded.

The kneaded mixture was then molded into a honeycomb structure by use of a screw extruder provided with a honeycomb forming nozzle. The thus obtained mold was left standing for drying for sufficient period of time, and then air dried at 100° C. for 5 hours. The mold was then cut at both axial ends to a predetermined length, and calcined at 450° C. for 3 hours in an electric oven, to provide a honeycomb mold of 7.4 mm in cell pitch, 1.35 mm in wall thickness, 150 mm×150 mm in outer diameter, 500 mm in axial length and 5.9 mm in equivalent diameter.

An amount of 19.2 kg of oxalic acid and 7.7 kg of ammonium metavanadate were added to water to form an aqueous solution in an amount of 40 lit. or in concentration of 150 g/l of vanadium pentoxide, which was then diluted to a concentration of 21.9 g/l with water.

The honeycomb mold obtained as above was immersed in the above diluted vanadium solution at 60° C., and immediately after taking the mold out of the solution, the mold was heated to 100° C. in 1 hour, dried at 100° C. for 5 hours, and calcined at 450° C. for 3 hours, to provide a honeycomb structure catalyst with a dual micropore structure.

The catalyst was found to contain $TiO_2$, $V_2O_5$ and $WO_3$ in amounts of 79.6%, 0.7% and 8.9% by weight based on the catalyst, respectively, with weight ratios $TiO_2//WO_3/V_2O_5$ of 89.0/10.0/0.8. Further the pore volume and pore size distribution of the catalysts were measured with a mercury porosimeter. FIG. 1 shows a micropore distribution and cumulative micropore volume of the catalyst.

The catalyst was found to have micropores of not less than about 50 Å in radius in amounts of 0.31 ml/g, and about 36% by volume of micropores of about 50-100 Å in radius and about 17% by volume of micropores of about 1000-60,000 Å based on the pore volume of the micropores of not less than about 50 Å in radius.

CONCENTRATIONS OF VANADIUM IN THE CATALYSTS

Figure 2:
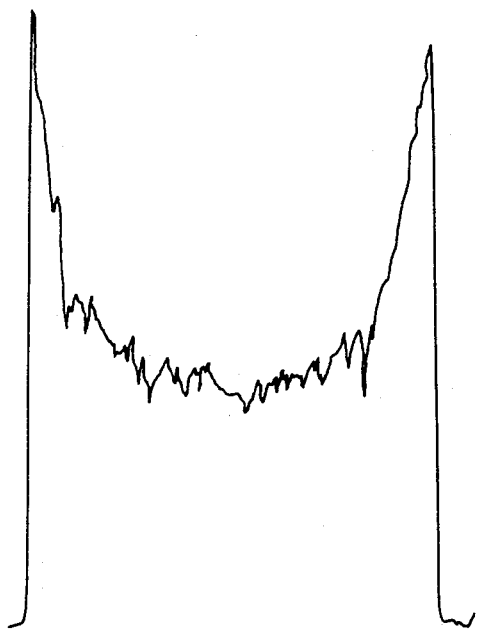
FIG. 2 depicts an x-ray microanalyzer profile of a catalyst wherein vanadium is concentrated in the surface layer.
Figure 3:
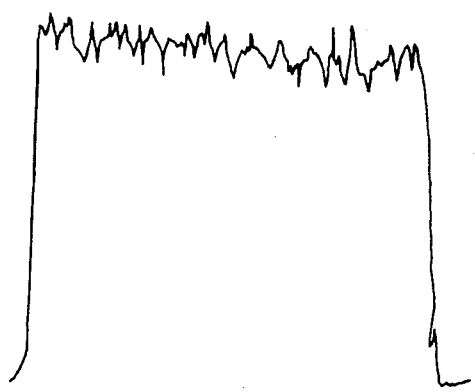
FIG. 3 depicts an x-ray microanalyzer profile of a catalyst wherein the vanadium is substantially in the same concentration throughout the catalyst.

The concentration distributions of vanadium in the catalysts prepared in Example 1 and Reference Example 1 were measured by use of an X-ray microanalyzer (ASM-SX by Shimazu K. K., Japan), and the results are shown in FIGS. 2 and 3, respectively. As apparent, the catalyst of Example 1 was found to contain vanadium concentratedly in the surface layer, whereas the catalyst of Reference Example 1 was found to contain vanadium in substantially the same concentration throughout the catalyst.

Further the concentrations of vanadium in the entire bodies of the catalysts and in the surface layer up to 200 μm in depth from the surface were determined by chemical analysis, and the results are shown in Table 1.

TABLE 1

| Catalyst | Concentrations of Vanadium (% by weight) | |
|---|---|---|
| | in Entire Bodies | in Surface Layers |
| Example 1 | 0.60 | 1.4 |
| Example 2 | 0.60 | 1.5 |
| Example 3 | 0.72 | 1.9 |
| Reference 1 | 0.60 | 0.6 |

DENITRIZING OF GASES CONTAINING ARSENIC COMPOUNDS

The catalysts prepared in Examples 1 to 3, and Reference Example 1 were cut into honeycombs of 300 mm in length and having nine openings extending therethrough in 3×3 cells, respectively.

At first, a gas mixture composed of 200 ppm of nitrogen oxides, 200 ppm of ammonia, 4% by volume of oxygen, 10% by volume of water vapor, 12% by volume of carbon dioxide, 800 ppm of sulfur dioxide and the balance nitrogen was put into contact with the individual catalyst at 380° C. at a space velocity of 4700 hr$^{-1}$ for a short period of time to determine initial denitrizing rates $\eta_1$ of the catalysts.

Then a gas mixture composed of 200 ppm of nitrogen oxides, 200 ppm of ammonia, 4% by volume of oxygen, 10% by volume of water vapor, 12% by volume of carbon dioxide, 800 ppm of sulfur dioxide, 25 ppm of diarsenic trioxide vapor, and the balance nitrogen was put into contact with the individual catalyst at 380° C. at a space velocity of 4700 hr$^{-1}$ for 5 hours, and denitrizing rates $\eta_2$ of the catalyst and $SO_2$ conversions were measured.

The denitrizing rate is defined by ((NOx concentration at the inlet of a reactor)−(NOx concentration at the outlet of a reactor)/(NOx concentration at the inlet of a reactor))×100 (%). The $SO_2$ conversion is defined as (($SO_2$ concentration at the inlet of a reactor)−($SO_2$ concentration at the outlet of a reactor)/($SO_2$ concentration at the inlet of a reactor))×100 (%). The results are shown in Table 2.

Further over-all coefficients of reaction velocity K and retensions of denitrizing activity R were calculated. K is represented by $-(\frac{1}{2})(S.V. \ln(1-\eta))/O.S.$ wherein S.V. is a space velocity of the gas put into contact with the catalyst, and O.S. is an outer surface area of the catalyst used per cubic meter, which was found 427 m$^2$/m$^3$ with all the catalysts. R is represented by $((\ln(1-\eta_2)/\ln(1-\eta_1))\times 100$ (%). The results are shown in Table 2.

TABLE 2

| Catalysts | Denitrizing Rates (%) | | Over-all Coefficients of Reaction Velocity | | Retentions of Denitrizing Activity (%) | $SO_2$ Conversions (%) |
|---|---|---|---|---|---|---|
| | $\eta_1$ | $\eta_2$ | $K_1$ | $K_2$ | R | |
| Example 1 | 97.0 | 89.7 | 38.6 | 25.0 | 64.8 | 0.7 |
| Example 2 | 97.9 | 91.9 | 42.5 | 27.6 | 64.9 | 0.7 |
| Example 3 | 98.2 | 93.9 | 44.2 | 30.8 | 69.7 | 0.8 |

TABLE 2-continued

| Catalysts | Denitrizing Rates (%) | | Over-all Coefficients of Reaction Velocity | | Retentions of Denitrizing Activity (%) | $SO_2$ Conversions (%) |
|---|---|---|---|---|---|---|
| | $\eta_1$ | $\eta_2$ | $K_1$ | $K_2$ | R | |
| Reference 1 | 96.2 | 82.6 | 36.0 | 19.2 | 53.3 | 0.6 |

Notes:

(1) $K = -\frac{1}{2} \times \frac{S.V.}{O.S.} \ln(1 - \eta)$ wherein S.V. is a space velocity of the gas, and O.S. is an outer surface area of the catalyst used per m² (427 m²/m³).

(2) Retensions of denitrizing activity are defined as $\frac{\ln(1 - \eta_2)}{\ln(1 - \eta_1)} \times 100(\%)$.

What is claimed is:

1. A catalyst for denitrizing nitrogen oxides contained in waste gases, which comprises: titanium and vanadium therein in weight ratios of oxides of titanium to oxides of vanadium ranging from 99.9:0.1 to 92.0:8.0, the vanadium being concentratedly contained in the surface layer of the catalyst up to 200 μm in depth from the surface of the catalyst in concentrations of at least about 1.5 times as much as the concentrations of vanadium throughout the catalyst, and the catalyst having micropores of about not less than about 50 Å in amounts of 0.25-0.40 ml/g, and micropores of about 50-100 Å in radius in amounts of about 10-40% by volume and micropores of about 1000-60,000 Å in radius in amounts of not less than about 10% by volume, respectively, based on the total volume of the micropores of not less than about 50 Å in radius.

2. A catalyst for denitrizing nitrogen oxides contained in waste gases, which comprises: titanium and vanadium in weight ratios of oxides of titanium to oxides of vanadium ranging from 99.9:0.1 to 92.0:8.0, and at least one of tungsten and zirconium in weight ratios of oxides of titanium to oxides of tungsten ranging from 98.0:2.0 to 70.0:30.0, and in weight ratios of oxides of titanium to oxides of zirconium ranging from 99.5:0.5 to 90.0:10.0, respectively, the vanadium being concentratedly contained in the surface layer of the catalyst up to 200 μm in depth from the surface of the catalyst in concentrations of at least about 1.5 times as much as the concentrations throughout the catalyst, and the catalyst having micropores of about not less than about 50 Å in amounts of 0.25-0.40 ml/g, and micropores of about 50-100 Å in radius in amounts of about 10-40% by volume and micropores of about 1000-60,000 Å in radius in amounts of not less than about 10% by volume, respectively, based on the total volume of the micropores of not less than about 50 Å in radius.

3. A catalyst in the form of honeycombs for denitrizing waste gases that contain a substantial amount of arsenic compounds and sulfur dioxide together with dusts therein, which comprises titanium, tungsten and vanadium therein in weight ratios of oxides of titanium to oxides of tungsten and oxides of vanadium ranging from 92.5:6.9:0.6 to 82.4:16.5:1.1, the titanium being contained in the catalyst in amounts of about 70-90% by weight in terms of titanium dioxide, and the vanadium being concentratedly contained in the surface layer of the catalyst up to 200 μm in depth from the surface of the catalyst in concentrations of at least about 1.5 times as much as the concentrations of vanadium throughout the catalyst, the catalyst having micropores of about not less than about 50 Å in amounts of 0.25-0.40 ml/g, and micropores of about 50-100 Å in radius in amounts of about 10-40% by volume and micropores of about 1000-60,000 Å in radius in amounts of not less than about 10% by volume, respectively, based on the total volume of the micropores of not less than about 50 Å in radius, and the honeycombs having walls of about 0.6-1.8 mm in thickness.

4. The catalyst as claimed in claim 3, wherein the vanadium is concentratedly contained in the surface layer of the catalyst up to 100 μm in depth from the surface of the catalyst in concentrations of at least about 1.5 times as much as the concentrations of vanadium throughout the catalyst, and the honeycombs have walls of about 1.0-1.4 mm in thickness.

5. The catalyst as claimed in claim 3, wherein the tungsten is in part or entirely replaced by molybdenum.

* * * * *